Figure 1:
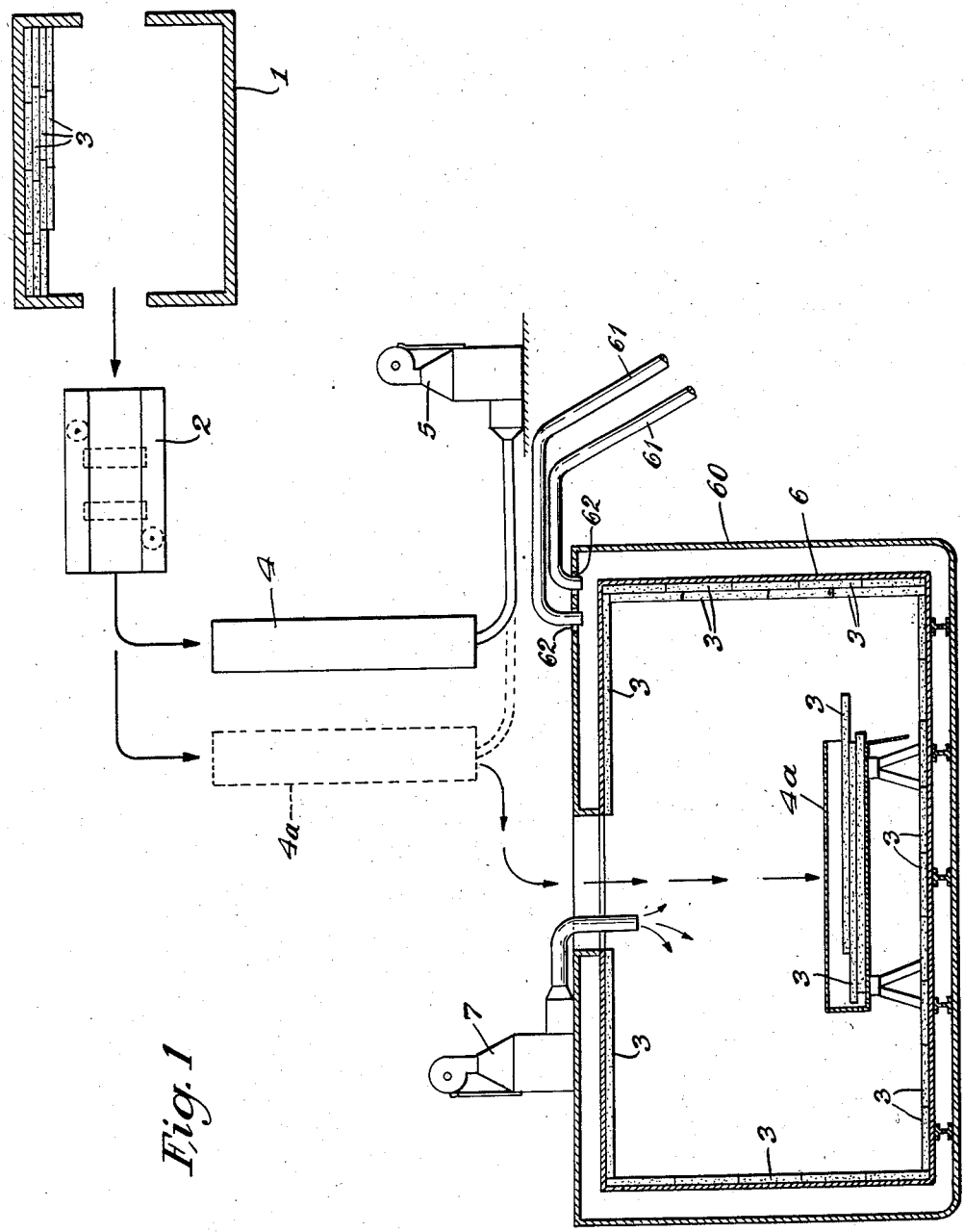

Inventor
Sterling Beckwith
by Parker & Carter
Attorneys

United States Patent Office 2,873,778
Patented Feb. 17, 1959

2,873,778

METHOD AND APPARATUS FOR CONTROLLING ATMOSPHERIC CONDITIONS DURING INSTALLATION

Sterling Beckwith, Lake Forest, Ill., assignor, by mesne assignments, to Constock Liquid Methane Corporation, a corporation of Delaware Application January 12, 1955, Serial No. 481,382

1 Claim. (Cl. 144—309)

My invention relates to improvements in and methods for installing insulating linings in tanks and the like.

One object of my invention is to make it possible to install in a metal tank an insulating lining under such circumstances that the lining will subsequently expand, exert a pressure upon the tank wall and as a result will be pre-compressed.

Another object of my invention is to make it possible to so control the dimensions of the elements of which the lining is to be built up as to make possible accurate installation under controlled conditions whereby the pre-stressing of the lining will be generally uniform and controlled in amount.

Another object of the invention is to so control the pre-stressing and pre-compression of the lining that when a cold liquid is placed in the tank, the resultant shrinkage will throughout the entire area exposed to the liquid be less than the shrinkage resulting from the pre-compression of the lining before contact with the liquid so that voids and gaps in the lining will not form, thus maintaining a continuous lining barrier between the cold liquid and the metal tank wall.

I prefer to assemble the lining in the tank by the use of a multiplicity of pre-shaped panels which may be prepared in any convenient manner, for example, by cementing together a plurality of pieces of the lining material, each smaller than the panel, the panel being thereafter sized to the desired dimensions.

I propose to obtain the desired pre-compression of the lining by shrinking each panel before installation and a convenient way in which the panel may be shrunk is by drying it. It is well known that an insulation panel especially of wood or the like will, when dried, shrink and to some extent change its shape.

I propose therefore to assemble in any suitable way a multiplicity of panels of the approximate size and shape desired. These panels will then be shrunk in a drying zone. After such shrinking has taken place, the panels will be machined to desired dimensions. This machining may take place if desired in an open room exposed to ambient air because the time involved in machining is so slight that little if any moisture absorption will take place but if desired, machining can be done in a dry room of controlled atmosphere.

After machining, each panel will be placed preferably in a portable box wherein a dry atmosphere will be maintained to prevent moisture absorption. When such box is filled with a number of panels, it will then be conveyed to the tank and there opened and the panels will be installed as part of the lining, a dry atmosphere being also maintained in the tank so that there will be no expansion of the panels or of the lining until the tank has been completely lined.

If desired, the step involving the placing of the panels in a box may be omitted and the panel may be conveyed directly after machining from the machining or planing zone to the tank at a rate of speed high enough to prevent important moisture absorption before the panel enters the tank.

The temperature and the moisture content of the area wherein the panels are machined to size and assembled as part of the lining in the tank must be such that men can effectively work and therefore the moisture content may be higher and the temperature lower than that prevailing in the initial drying room. If desired, a single mechanism for drying the air in the boxes and in the tank may be used or separate mechanisms may be used for the boxes and the tank as the case may be.

Other objects will appear from time to time throughout the specification and claim.

Figure 2:
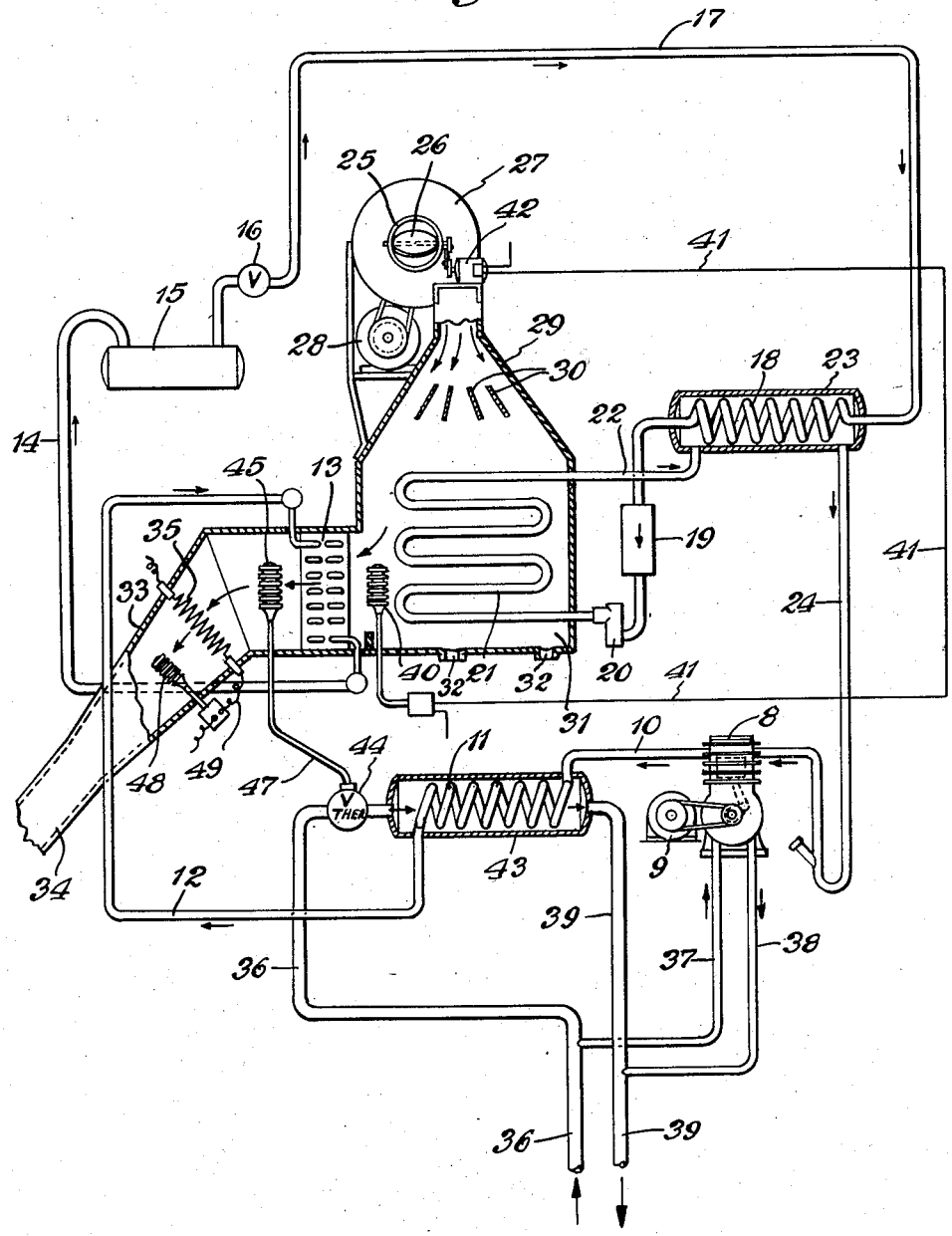

My invention is illustrated more or less diagrammatically in the accompanying drawings, wherein Figure 1 is a flow sheet illustrating diagrammatically the movement and treatment of the panels toward the tank to be lined;

Figure 2 is a diagrammatic flow sheet of a suitable drying mechanism.

Like parts are indicated by like characters throughout the specification and drawings.

Referring first to Figure 1, a drying room is indicated at 1. The method and apparatus for maintaining a drying atmosphere in the drying room form no part of the present invention and are not here illustrated. Neither are the method and apparatus used for the preparation of the panels prior to drying illustrated. 2 is a planing or machining zone where individual panels 3 brought from the drying room after drying will be machined to desired size and shape. 4, 4a indicate dry boxes of such size and so placed as to receive immediately after the planer has done its work, each individual panel. A plurality of the panels will be received in each box and when the box is full, it will be transported into the tank. 5 illustrates an air drying machine which supplies dry air of the desired temperature and humidity contact to the dry boxes 4, 4a as the case may be. 6 is a metal walled tank ported as indicated. Panels 3 are illustrated in the tank having been built into the partially installed lining. 7 is an air drying machine associated with the tank adapted to control the atmosphere in the tank during the time the lining is being installed. While I have illustrated two separate air drying machine 5, 5 one of them being adapted for selective connection by one of the dry boxes by a flexible conduit, it will be understood that one machine might dry the atmosphere for both the dry boxes and the tank.

It will be understood that as the lining is built up out of a multiplicity of panels glued to the tank wall or to one another both face to face and edge to edge, as long as the atmosphere in the tank remains at the desired dry point, any absorption of moisture by the individual panels and by the lining as it is built up will be negligible and when the lining has finally been completely assembled, all that is necessary is to withdraw the air drying machine and allow the ambient atmosphere to come in contact with the lining whereby the lining will absorb moisture, expand and build up the desired pre-compression.

Referring to Figure 2 which illustrates diagramatically the elements of the air drying machine, 8 is a compressor driven by the motor 9. Refrigerant gas compressed in 8 passes through the duct 10 to a superheat removing heat exchange mechanism 11 which, as will hereinafter appear, is under some conditions inactive and under other conditions cools the gas. The gas perhaps under some conditions with liquid entrained with it passes through the duct 12 to the condenser 13. It is there condensed, passes through the duct 14 to the receiver 15 through the control valve 16, duct 17, and heat exchanger coil 18, drier 19, expansion valve 20, evaporator coil 21, duct 22 to the heat exchanger 23, thence through the duct 24 back to the compressor 8 in closed refrigeration circuit.

The ambient air is drawn in through the port 25 controlled by the damper 26 to the blower 27, driven by a motor 28. The blower discharges through the funnel 29, past a plurality of air guide vanes 30 to the dehumidifying chamber 31 which contains the evaporator coil 21. The air is cooled, the moisture condenses and is discharged through ports 32 from the system. The dry cold air then passes out through and around the condenser coils 13 into the discharge funnel 33 and thence to the duct 34 which may discharge into the tank 6 where the lining is being assembled or to the dry boxes 4, 4a or both. 35 is an electric air heating grid in the funnel 33.

Cooling water enters the system through the pipe 36, 37 to cool the compressor 8 and leaves through pipe 38 for discharge to the pipe 39. 40 is a thermostat in the path of the air from cooling chamber 31 which is electrically connected by the control line 41 to actuate the motor or solenoid 42 which controls the position of the air intake damper 26, being normally set to control the air intake damper responsive to change in the temperature of the air discharged from the chamber 31.

The pipe 36 also conducts cooling water from any suitable source of supply to the superheat removing housing 43 in which the coil 11 is located and the pipe 39 receives and discharges the cooling water from the housing 43, the flow of water being controlled by the valve 44. 45 is a temperature responsive bulb in the flow of air from the condenser connected by any suitable connecting means 47 to actuate the valve 44. Normally when the temperature of the air discharged from the condenser exceeds 90°, the valve 44 will be open to permit water to circulate through the housing 43 and remove superheat from the gas in the coil 11. As long as the air temperature is below 90° for example, no water will circulate. When it gets above 90° superheat will be removed and as a result the temperature will be brought down to the desired point, for example 90°. If any condensation takes place in the superheat removal, the condensate will be carried on to the condenser in the usual way.

48 is a heat responsive member in the funnel 33 beyond the heating coil 35 connected thereto by a control duct 49 and so arranged that if the temperature on the downstream side of the electric heater 45 falls below 90° or whatever other temperature is selected, the electric heating coil will be energized to raise the temperature of the air.

These three control mechanisms cooperate to insure that the temperature of the air discharged to the tank where the work is being done no matter what the ambient atmospheric conditions and no matter what the moisture conditions may be is of the desired temperature and of course the usual controls characteristic of a refrigeration cycle of the type diagrammatically illustrated will be so set that water will not freeze and frost will not form on the evaporator coil. Water will be condensed and be discharged from the system so that the 90° air or whatever other air temperature is desired, will always enter the work area in a very low moisture condition. Just how dry the air may be is not too important because so long as it is dry enough so that the insulating elements pick up no moisture, that is satisfactory.

The performance of the unit is determined by the temperature at discharge from the air dehumidifying chamber 31 which should be as low as possible without frosting, for example 38° F. The damper controlling air flow to the blower decreases air flow when during hot weather or when refrigeration is inadequate to keep the temperature of air discharge at for example 38° F. It is desirable that the temperature be maintained as high as possible for the further reason that such high temperatures serve to promote rapid setting of those glue joints involved in the assembly of the insulation in the tank which cannot be dielectrically heated.

It will be realized that while I have shown and described an operative device and method nevertheless many changes might be made in the size, shape, disposition and number of parts without departing materially from the spirit of my invention. For example, while two air drying machines are illustrated, under some circumstances, a single such mechanism could be employed to control the atmospheric conditions in dry boxes and the tank or tanks in which insulation is being installed. Further, while one tank is illustrated, a plurality of tanks could be insulated simultaneously, depending only upon the production rate of the drying room and shaping station 2. I therefore wish my description and drawings to be taken as in a broad sense, illustrative or diagrammatic rather than as limiting me to my precise showing.

The warm air forced into the tank raising its temperature to for example 90° F. raises the temperature of the steel tank wall and this is important because it expedites the setting of the glue between the insulating layer and the metal wall.

The air, for example at 90°, tends to raise the temperature of the tank wall toward the same 90° but convection and radiation on the outside of the metal wall tends to hold the temperature down below the temperature of the air on the inside. This heat loss can be minimized by warming the outside of the tank and if for example, the tank is contained within the hull of a water-borne vessel, warm air without reference to its humidity content may be pumped into the ventilation or air space between the vessel wall and the tank wall. I have therefore illustrated at 60, most diagrammatically, the hull of a barge which contains the tank. The pipes 61 bring hot air from any suitable source and discharge it through the ventilating opening 62 so that the hot air is circulated around the tank wall on the outside, thereby cooperating with the moisture controlled from air on the inside of the tank in raising the temperature of the tank wall. Means for supplying hot air, forming no part of the present invention, are not here illustrated.

I claim:

The method of installing a lining in a metal tank which consists in drying and shrinking a multiplicity of separately prepared segments of insulating material, machining each segment while in a dried and shrunken condition to predetermined size and shape, discharging the segments to a storage zone, before they have had time to absorb substantial amounts of moisture, maintaining the atmosphere in the storage zone at such moisture content and temperature as will prevent substantial absorption of moisture by the segments and after a suitable number of segments have been placed in the storage zone conveying the zone with the segments therein to and placing them in the tank, then assembling a plurality of such segments to form a lining for the tank while maintaining in the tank an atmosphere of such moisture content and temperature as to prevent substantial absorption of moisture by the segments and after the lining has been completely installed, causing such change in the moisture content of the atmosphere in the tank as will permit absorption of moisture by the segments with resultant compression of the lining.

References Cited in the file of this patent

UNITED STATES PATENTS

| | | |
|---|---|---|
| 1,119,011 | Grosvenor | Dec. 1, 1914 |
| 2,303,745 | Karreman | Dec. 1, 1942 |
| 2,369,511 | Winkler | Feb. 13, 1945 |
| 2,649,124 | Merron | Aug. 18, 1953 |
| 2,710,509 | Ayling | June 14, 1955 |
| 2,770,272 | Morrison | Nov. 13, 1956 |